(12) United States Patent
Prakash

(10) Patent No.: US 7,145,870 B2
(45) Date of Patent: Dec. 5, 2006

(54) METHOD AND APPARATUS FOR COMBINING DEDICATED AND SHARED NETWORKS FOR EFFICIENT DATA TRANSMISSION

(75) Inventor: Adityo Prakash, Redwood Shores, CA (US)

(73) Assignee: Altera Corporation, San Jose, CA (US)

( * ) Notice: Subject to any disclaimer, the term of this patent is extended or adjusted under 35 U.S.C. 154(b) by 897 days.

(21) Appl. No.: 09/999,189

(22) Filed: Nov. 29, 2001

(65) Prior Publication Data

US 2002/0080785 A1   Jun. 27, 2002

Related U.S. Application Data

(60) Provisional application No. 60/253,961, filed on Nov. 29, 2000.

(51) Int. Cl.
*H04J 1/19* (2006.01)
(52) U.S. Cl. ..................... 370/229; 370/237
(58) Field of Classification Search ............ 370/389, 370/229, 232, 227, 228, 235, 237, 238, 247, 370/248, 252, 253, 395.41, 395.3, 395.21, 370/352, 353, 354, 355, 356, 395.2, 395.32, 370/422
See application file for complete search history.

(56) References Cited

U.S. PATENT DOCUMENTS

| 5,463,620 | A | | 10/1995 | Sriram |
| 5,612,897 | A | * | 3/1997 | Rege ......................... 709/219 |
| 6,035,196 | A | * | 3/2000 | Hengeveld et al. ......... 455/437 |
| 6,081,291 | A | | 6/2000 | Ludwig, Jr. |
| 6,091,722 | A | * | 7/2000 | Russell et al. .............. 370/352 |
| 6,147,975 | A | | 11/2000 | Bowman-Amuah |
| 6,363,065 | B1 | * | 3/2002 | Thornton et al. ........... 370/352 |
| 6,381,594 | B1 | * | 4/2002 | Eichstaedt et al. ............ 707/3 |
| 6,449,588 | B1 | | 9/2002 | Bowman-Amuah |
| 6,473,793 | B1 | * | 10/2002 | Dillon et al. ............... 709/223 |
| 6,671,741 | B1 | | 12/2003 | Dillon |

* cited by examiner

Primary Examiner—Brenda Pham
(74) Attorney, Agent, or Firm—Okamoto & Benedicto LLP

(57) ABSTRACT

The utilization of an overflow link is envisioned within a communication network to increase bandwidth. In order to increase bandwidth when necessary, an alternate overflow network is utilized to transfer data between a local data center and an individual receiving location. In this process, a portion of the data packets are transmitted to a different receiving location with available bandwidth. The packets are then transmitted from this location to the original requesting location via a shared communications link between the two receiving locations, thus increasing the bandwidth between the local center and the individual receiving location until the additional demand is met.

15 Claims, 3 Drawing Sheets

METHOD AND APPARATUS FOR COMBINING DEDICATED AND SHARED NETWORKS FOR EFFICIENT DATA TRANSMISSION

CROSS-REFERENCES TO RELATED APPLICATIONS

The present disclosure claims priority from U.S. Provisional Patent Application No. 60/253,961 filed Nov. 29, 2000, and entitled "Hybrid StarOverflow Network," the disclosure of which is hereby incorporated by reference for all purposes.

FIELD OF THE INVENTION

The present invention relates to broadband content distribution networks utilizing Asynchronous Transfer Mode (ATM) or Internet Protocol (IP) or Wireless protocol backbone transport and a system of coordinated servers, storage devices, caching devices and a stream manager.

BACKGROUND OF THE INVENTION

The present invention relates to electronic communication systems. More specifically, the present invention relates to a communication network system that utilizes additional network connections when necessary to increase bandwidth.

Many networks exist to carry data having various bandwidth requirements. One such network is a global internetwork of networks known as the "Internet". In the early days of networking, data was usually in the form of text and small data sets. The transfer of large, megabyte data sets was known, but typically such large data sets were few and far between and their recipient was content with receiving the data set over a long period of time if the network bandwidth was such that the transmission would take a long period of time.

In the current environment, with the explosion in popularity of networking for entertainment, commerce and other new uses (as well as the old uses), many users expect to get large bandwidth data sets and they expect to get it in real-time, or near real-time.

Many network architectures employ dedicated connections between a transmitting center herein also referred to as a local center and multiple receiving locations which may often be end users. This is the case for instance with a classic DSL network architecture. Often the receiving locations are also connected with one another via another network that is shared by all or many of the receiving locations. Examples of such shared network connections would be cable wiring connecting homes in a neighborhood or a shared wireless network among homes in a neighborhood. The dedicated connections between the local center and receiving locations are often bandwidth constrained and the ability to increase data throughput into a receiving location beyond what the dedicated link can support is often desirable. This is what the present invention addresses.

SUMMARY OF THE INVENTION

The present invention provides a communication network system, comprising: a transmitting center also called interchangeably a local center connected via dedicated links to receiving locations. The receiving locations are further connected to each other via a shared network. In the present invention additional data from the local center that cannot the sent via the dedicated link to an individual receiving center is redirected to an available dedicated link to a different receiving location that can then retransmit this data over the shared network to the target receiving location. In the current embodiment, when certain content requested by the end user approaches or exceeds the channel capacity for that particular connection, the stream manager at the local center makes a determination as to whether any of the other receiving locations have available bandwidth, and redirects some packets to the receiving location with available bandwidth. The packets then get transmitted through a shared network to the receiving location that originally requested the data.

DESCRIPTION OF THE SPECIFIC EMBODIMENTS

Figure 1A:
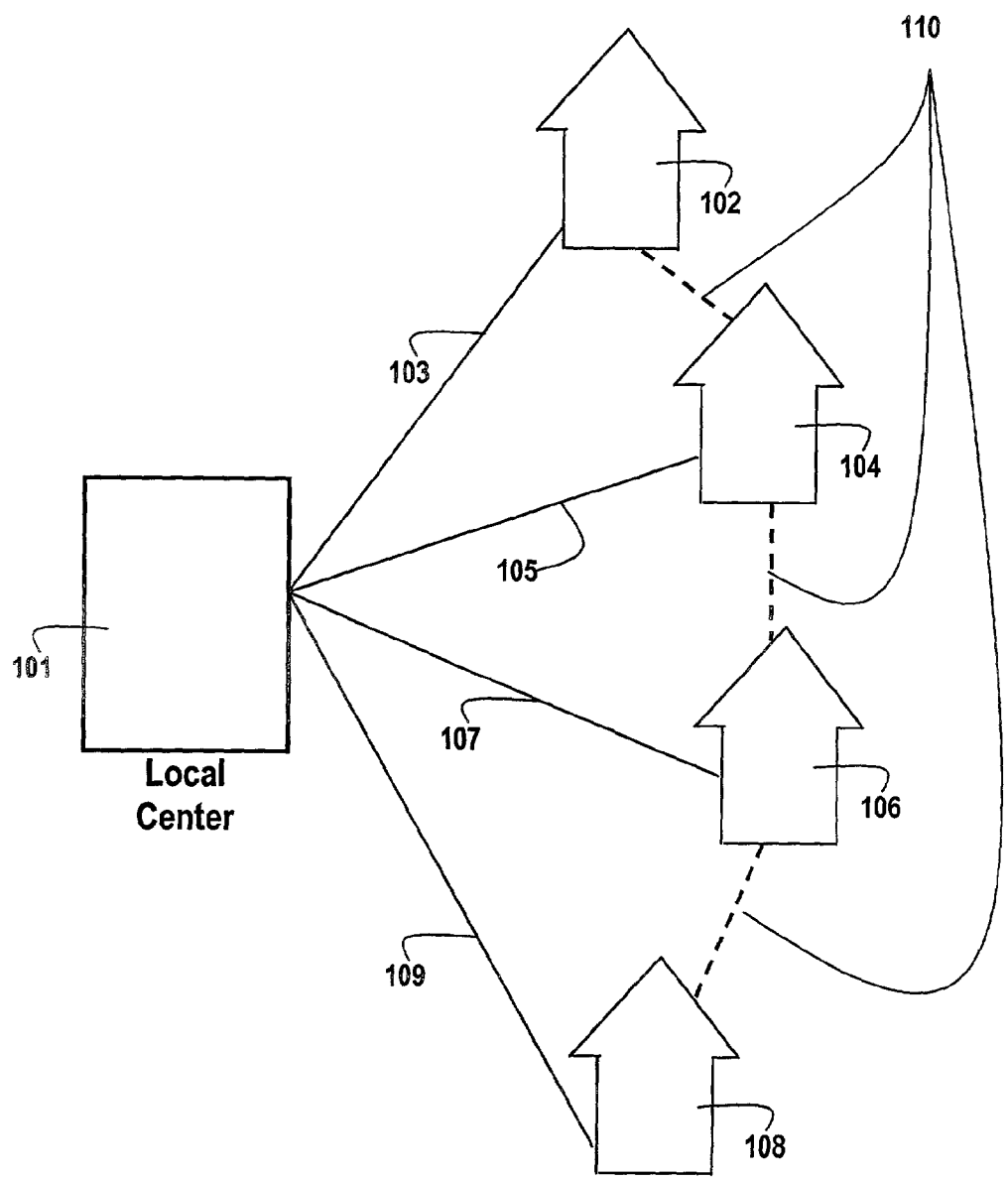
FIG. 1A illustrates the basic design of the current invention.

As shown in the exemplary drawings wherein like reference numerals indicate like or corresponding elements among the figures, the present invention includes a communication network system. The system utilizes wireless channels, or wireless links, when necessary to increase bandwidth.

Figure 1B:
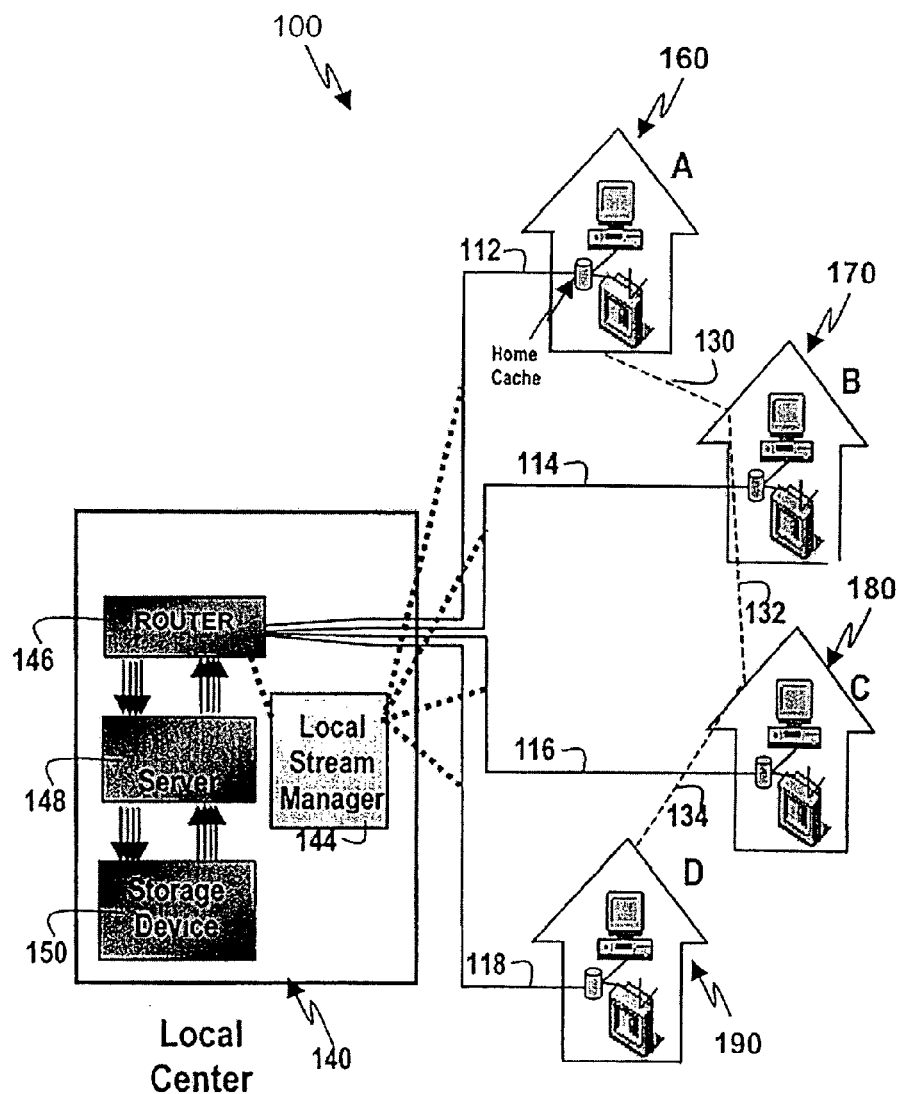
FIG. 1B illustrates one embodiment of a communication network system in accordance with the present invention.

FIG. 1A illustrates the basic design of the current invention. In this system, a local data storage and distribution center 101 is connected to a plurality of receiving locations 102, 104, 106 and 108 through direct communication links 103, 105, 107 and 109 respectively. The individual receiving locations are also part of a shared network 110. The shared network 110 is utilized, when necessary, to increase bandwidth. A local stream manager is coupled to the local center 101 and is responsible for determining the statistical usage pattern of the receiving locations connected to the local center. The local stream manager is also capable of directly determining load on the individual links connecting the local center and receiving locations. The Referring now to FIG. 1B, one embodiment of a communication network system 100 in accordance with the present invention is illustrated. The system includes a local center 102 situated near the end user receiving locations. Four receiving locations, 160, 170, 180 and 190, are shown for purposes of illustration; however, more or fewer receiving locations may be a part of the present system. The system 100 includes a plurality of data lines, each having a hub end and a spoke end. Four data lines, 112, 114. 116 and 118, are shown for purposes of illustration; however, more or fewer lines may be used. In one embodiment, these lines can be of the ASDL type, or other variations of DSL falling aenerally into the class known as KDSL. The individual receiving locations are part of a shared network. The individual links that are a part of the shared network connect one receiving location to the next. Links 130, 132 134 connect all of the receiving locations in shared network architecture. In one embodiment of the present invention, the overflow data link may be a wireless link. In other embodiments the overflow link may be a digital cable link or any other packet based network link.

In the current embodiment of the present invention, when, for instance, receiving location 160 requests a specific content that requires higher bandwidth than is available in the communications link 112, a part of the data packets are redirected to another receiving location 170 from where the packets are sent to location 160 through the shared link 130 thus effectively increasing the bandwidth available to the receiving location 160.

The local center 140 will house a set of equipments for storage and transmission, which may include one or more of each of a router 146, server 148, and a storage device 150. In addition, the local center will contain a local stream manager 144. The above description describes the current best mode and represents one embodiment of the invention.

In the present embodiment the capabilities of the local stream manager include but are not limited to:

1) Determining statistical usage pattern of the receiving locations

2) Detection of load on individual links connecting the local center and the receiving locations.

3) Identification of receiving locations that have available bandwidth based on statistical usage pattern.

4) Identification of receiving locations that have available bandwidth based on direct detection of load on individual links.

5) Redirecting packets to one or more receiving locations with available bandwidth when the data rate in the line connecting the local center and a receiving location reaches or exceeds a threshold level.

6) Ability to initiate delivery of the redirected packets via the overflow link to the receiving location that requested it.

7) Ability to stop redirecting packets and resume only direct streaming to the receiving location when the data rate drops below the threshold rate.

The identification of a receiving location with available bandwidth takes advantage of the statistical usage patterns of the receiving locations. By determining the statistical usage pattern of receiving locations, the local stream manager determines which receiving location has available bandwidth and sends a portion of the data packets to the receiving location from where the data is redirected to the receiving location that originally requested it. In another embodiment the stream manager may detect available bandwidth by directly detecting load on a link between a receiving location and the local center.

Figure 2:
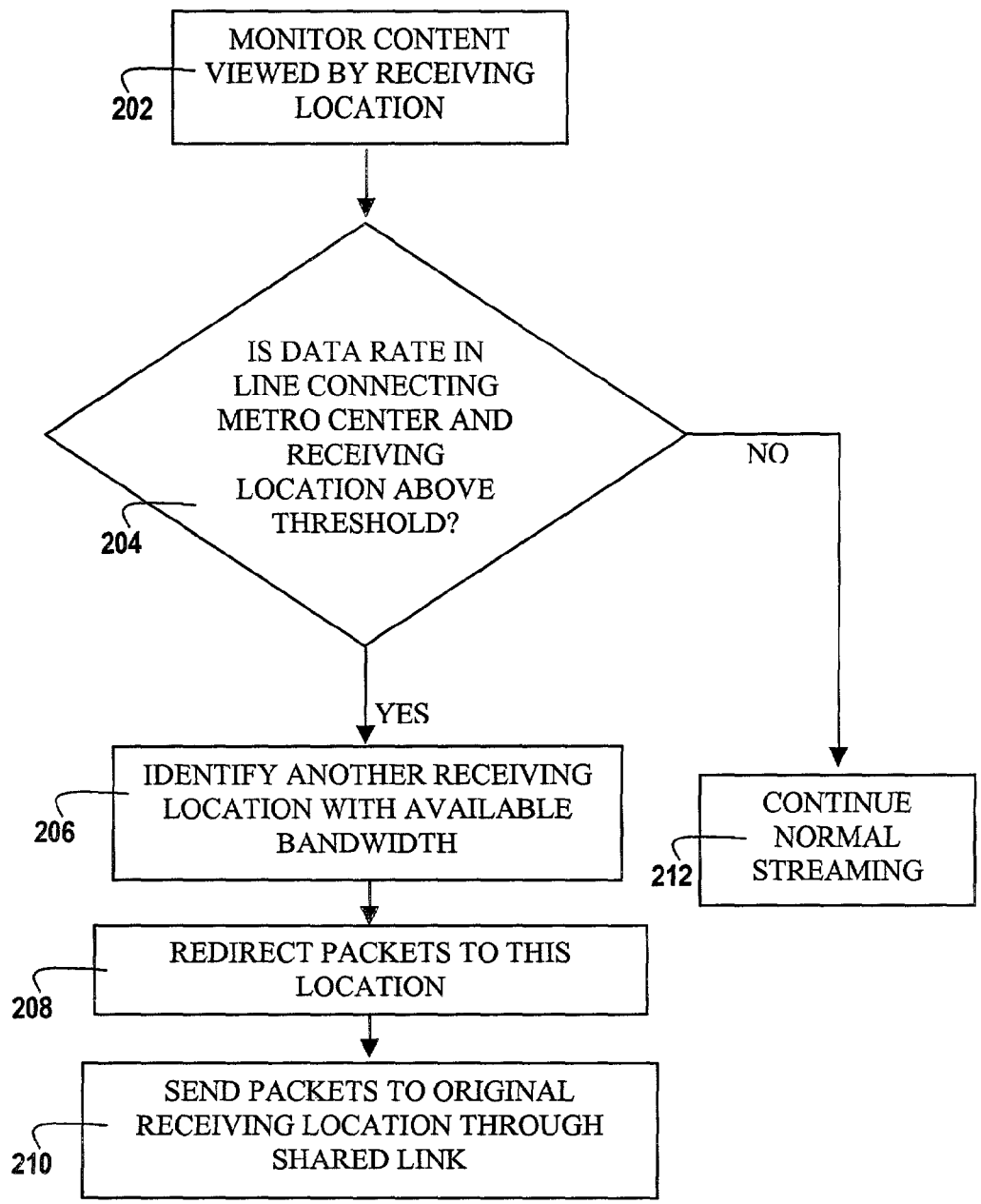
FIG. 2 illustrates the role of the local stream manager in the method of utilizing the overflow channels.

FIG. 2 illustrates role of the local stream manager 144 in the method of utilizing the overflow channels. The local stream manager continuously monitors the contents requested by individual viewing locations (202). If the data rate in the line connecting the local center and any individual location reaches a threshold beyond which congestion may occur (204), the local stream manager identifies a receiving location that has available bandwidth (206) and redirects some of the packets to this location (208). The packets are then transmitted from this location to the receiving location that originally requested the content via a network link shared between the receiving location that received the packets and the location that originally requested the data (210). Once the data rate in the line falls below threshold level, the local stream manager stops redirecting packets and resumes normal content streaming direct data lines connecting the local center and the receiving location. In another embodiment, it is envisioned that packets may be sent to a plurality of receiving locations with available bandwidth and then transmitted to the original receiving location via multiple wireless links. In another embodiment of the invention, the stream manager may utilize the overflow link to transfer data in the absence of a specific request for content by the receiving location. This may be done when there is an anticipated need for a certain content and the data cache at the individual receiving location may need to be filled with the data packets that are anticipated in a time dependent manner.

The above description is illustrative and not restrictive. The scope of the invention should, therefore, be determined not with reference to the above description, but instead should be determined with reference to the appended claims along with their full scope of equivalents.

What is claimed is:

1. A communication network system based on the hub-and-spoke architecture, comprising:
a content server coupled with a local center;
a plurality of xDSL links, each having a hub end and a spoke end, wherein each of the hub ends is coupled with the local center, and each of the spoke ends is connected with one of a plurality of end-user receiving locations;
a local stream manager located at the local center and detect data rates on said links; and
an overflow data link connecting a first receiving location to a second receiving location which is at a separate location from the first receiving location,
wherein the local stream manager further (a) determine if a data rate on the link connecting the local center to the first receiving location exceeds a threshold, (b) redirect packets destined for the first receiving location to the link connecting the local center to the second receiving location when said threshold is exceeded, and (c) initiate delivery of the redirected packets via the overflow data link from the second receiving location to the first receiving location,
wherein the local stream manager is further identifies a receiving location that has available bandwidth based upon direct detection of load on the link connecting the receiving location and the local center.

2. The communication network system of claim 1, wherein the overflow data link is a wireless link.

3. The communication network system of claim 1, wherein the overflow data link is a shared communications link between at least two receiving locations.

4. The communication network system of claim 1, wherein the local stream manager detects load on the individual links connecting the local center and the receiving locations.

5. The communication network system of claim 1, wherein the local stream manager determines a statistical usage pattern of the receiving locations connected to the local center.

6. The communication network system of claim 5, wherein the local stream manager identifies a receiving location that has available bandwidth based upon the statistical usage pattern of the receiving locations.

7. The communication network system of claim 1, wherein the local stream manager stops the redirecting of packets when the data rate in the link between the local center and the first receiving location falls below the threshold rate.

8. A local center of a communication network, the local center comprising:
a content server;
a router interconnect the local center in a hub-and-spoke topology with a plurality of receiving locations by way of a plurality of direct links, wherein each direct link comprises an xDSL link; and a local stream manager at the local center which detect data rates on said direct links, wherein the local stream manager further (a) determine if a data rate on a first direct link connecting the local center to a first receiving location exceeds a threshold, (b) redirect packets destined for the first receiving location on a second direct link to a second receiving location which is at a separate location from the first receiving location when said threshold is exceeded, and (c) initiate delivery of the redirected packets via an overflow data link from the second receiving location to the first receiving location, wherein the local stream manager further identifies a receiving location that has available bandwidth based upon direct detection of load on the link connecting the receiving location and the local center.

9. The local center of claim 8, wherein the local stream manager determines a statistical usage pattern of the receiving locations connected to the local center.

10. The local center of claim 9, wherein the local stream manager identifies a receiving location that has available bandwidth based upon the statistical usage pattern of the receiving locations.

11. The local center of claim 8, wherein the local stream manager stops the redirecting of packets when the data rate in the link between the local center and the first receiving location falls below the threshold rate.

12. A method of communicating packets from a local center of a communication network interconnected via a hub-and-spoke configuration to a plurality of receiving locations, the method comprising:

determining by a local stream manager at the local center if a data rate on a first direct link connecting the local center to a first receiving location exceeds a threshold;

redirecting packets destined for the first receiving location such that the packets are transmitted on a second direct link to a second receiving location which is at a separate location from the first receiving location when said threshold is exceeded;

initiating delivery of the redirected packet via an overflow link from the second receiving location to the first receiving location, wherein the first and second direct links each comprises an xDSL link; and identifying a receiving location that has available bandwidth based upon direct detection of load on the link connecting the receiving location and the local center.

13. The method of claim 12, further comprising determining a statistical usage pattern of the receiving locations connected to the local center.

14. The method of claim 13, further comprising identifying a receiving location that has available bandwidth based upon the statistical usage pattern of the receiving locations.

15. The method of claim 12, further comprising stopping the redirecting of packets when the data rate in the link between the local center and the first receiving location falls below the threshold rate.

* * * * *